United States Patent
Gutowski et al.

(10) Patent No.: US 7,258,491 B2
(45) Date of Patent: Aug. 21, 2007

(54) BEARING SEAL ASSEMBLY FOR AGRICULTURAL APPLICATIONS

(75) Inventors: Jordan Eric Gutowski, Elk Grove Village, IL (US); Philip David Cox, Polk City, IA (US); Jarrod Ray Ruckle, Bondurant, IA (US); James Franklin Bierl, West Des Moines, IA (US)

(73) Assignees: Deere & Company, Moline, IL (US); Peer Bearing Company, Waukegan, IL (US)

( * ) Notice: Subject to any disclaimer, the term of this patent is extended or adjusted under 35 U.S.C. 154(b) by 165 days.

(21) Appl. No.: 11/146,445

(22) Filed: Jun. 7, 2005

(65) Prior Publication Data

US 2006/0274984 A1 Dec. 7, 2006

(51) Int. Cl.
*F16C 33/76* (2006.01)
(52) U.S. Cl. .................. 384/486; 384/478; 384/480
(58) Field of Classification Search ............... 384/460, 384/486, 484, 478, 480; 277/349, 423, 427, 277/562, 563, 351
See application file for complete search history.

(56) References Cited

U.S. PATENT DOCUMENTS

| | | | |
|---|---|---|---|
| 4,249,782 A | 2/1981 | Frank .................... 308/187 |
| 4,376,541 A * | 3/1983 | Walter et al. ................ 277/353 |
| 4,568,092 A | 2/1986 | Hayashida et al. ......... 277/152 |
| 4,792,242 A * | 12/1988 | Colanzi et al. ............. 384/482 |
| 4,792,243 A * | 12/1988 | Takeuchi et al. ............ 384/486 |
| 5,042,822 A * | 8/1991 | Dreschmann et al. ....... 277/353 |
| 5,419,642 A * | 5/1995 | McLarty ..................... 384/486 |
| 5,653,448 A | 8/1997 | Schlosser ..................... 277/38 |
| 5,908,249 A | 6/1999 | Nisley et al. ................ 384/484 |
| 6,008,557 A | 12/1999 | Dornhoefer et al. .......... 310/90 |
| 6,073,933 A | 6/2000 | Johnston ..................... 277/352 |
| 6,186,507 B1 | 2/2001 | Oldenburg ................... 277/353 |
| 6,481,896 B1 | 11/2002 | Ohtsuki et al. ............. 384/484 |
| 6,634,648 B1 | 10/2003 | Rockwell ..................... 277/572 |
| 6,719,459 B1 | 4/2004 | Gotoh ........................ 384/482 |
| 6,840,679 B2 | 1/2005 | Lenick et al. ............... 384/537 |

* cited by examiner

*Primary Examiner*—Thomas R. Hannon

(57) ABSTRACT

A contaminant-resistant bearing assembly includes a multi-lip seal with an extended shroud supported from the outer ring and projecting adjacent a stepped inner ring shoulder. A steel slinger supported from the inner ring is offset outwardly adjacent the shroud and includes a radially outer edge terminating closely adjacent the connection of the seal shroud to the outer ring. The slinger includes an outer portion angled inwardly from the radial direction and supporting a lip seal which contacts an angled portion of the seal shroud at a central location between the rings. A primary step machined on the inner ring prevents the slinger from being pushed into the seal.

18 Claims, 2 Drawing Sheets

US 7,258,491 B2

BEARING SEAL ASSEMBLY FOR AGRICULTURAL APPLICATIONS

FIELD OF THE INVENTION

The present invention relates generally to a bearing assembly and, more specifically, to a contaminant resistant bearing assembly having lip seal, slinger and shroud structure particularly useful in harsh environmental conditions such as agricultural tillage applications.

BACKGROUND OF THE INVENTION

A bearing assembly for use in extreme conditions often encounters dirt and mud which in time can accumulate and pack against sealing structure and push contaminants into the bearing cavity. Maintenance-free bearings cannot be easily lubricated, and therefore the foreign material typically cannot be flushed away. In applications where power washers are used to clean areas around the bearing, contaminants are often forced into the bearing cavity by the cleaning process. Once a bearing is contaminated, the bearing will eventually seize and fail to turn or become loose due to wear.

Contamination problems are particularly apparent in agricultural tillage implement bearings such as disk bearings operating in wet and muddy soil conditions. Mud packing and pushing against the seals compromises the contaminant protection of the bearing seals. Extreme temperature conditions and freezing of material around the bearing increases exposure to contamination. Several times a year such bearings may be exposed to high pressure washing, further increasing the contamination problem. Although bearing assemblies such as shown in U.S. Pat. No. 4,249,782 assigned to Deere & Company, have generally performed well most of the time, incidences of failure caused by the harsh environmental operating conditions still occur.

SUMMARY OF THE INVENTION

It is therefore an object of the present invention to provide an improved bearing assembly that overcomes most or all of the aforementioned problems. It is another object to provide such a system which eliminates most or all of the problems of contaminants entering the bearing during operation in harsh environmental conditions or during power washings.

It is another object of the present invention to provide an improved bearing assembly that has a reliable sealing system for resisting contamination in extreme environmental conditions. It is a further object to provide such an assembly that is particularly useful for operation in conditions wherein freezing, packing of material around the assembly or high pressure impact of material against the assembly is common. It is still another object to provide such a bearing assembly having significantly improved operating life compared to most previously available bearing when used in disk gangs or other agricultural implements.

In an embodiment of the invention, a bearing assembly includes a multi-lip seal with an extended shroud supported from an outer ring and projecting adjacent a stepped inner ring shoulder. A steel slinger supported from the inner ring is offset outwardly adjacent the shroud and includes a radially outer edge terminating closely adjacent the connection of the seal shroud to the outer ring. The slinger includes a outer portion angled inwardly from the radial direction and supporting a lip seal which contacts an angled portion of the seal shroud at a central location between the rings. A primary step machined on the inner ring prevents the slinger from being pushed into the seal. In one embodiment, a secondary step on the inner ring receives the innermost edge of the seal shroud and forms part of the labyrinth between the slinger and the seal shroud effectively sealing the bearing from contamination, even in the harshest of conditions.

These and other objects, features and advantages of the present invention will become apparent from the drawings and the following detailed description.

DESCRIPTION OF THE PREFERRED EMBODIMENT

Figure 1:
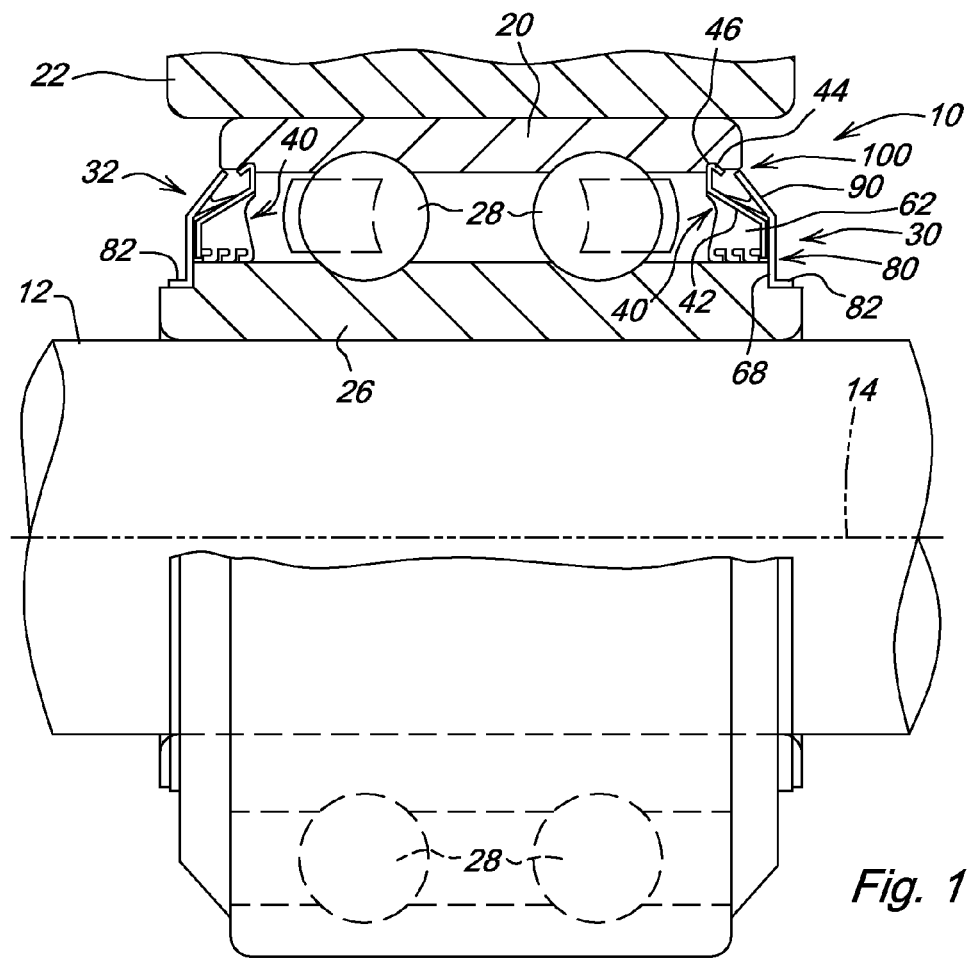
FIG. 1 is a plan view, partially in section, of a bearing assembly with sealing structure.

Referring to FIG. 1, therein is shown a bearing assembly 10 adapted for receiving a shaft 12 for rotation about an axis 14. The shaft 12 as shown is a disk gang axle supporting disk blades (not shown) for rotation in the soil.

The bearing assembly 10 includes an outer ring 20 non-rotatably supported in a disk standard 22 or other suitable mounting. An inner ring 26 is rotatably mounted by hardened steel balls or rollers 28. The shaft 12 is secured to the inner ring 26 for rotation about the axis 14. Although the bearing assembly is shown as a ball bearing, the seal structure described below may also be used with other types of bearings including roller bearings.

Sealing structure 30 and 32 is located at the axially outermost ends of the bearing assembly 10 to prevent contaminants from entering the assembly 10 and to resist external forces such as freezing material or dirt packed on the shaft that could otherwise compromise the blocking characteristics of the sealing structure 30 and 32. The sealing structure 32 is generally identical to that of the structure 30, and so only the structure 30 will be described in detail below.

Figure 2:
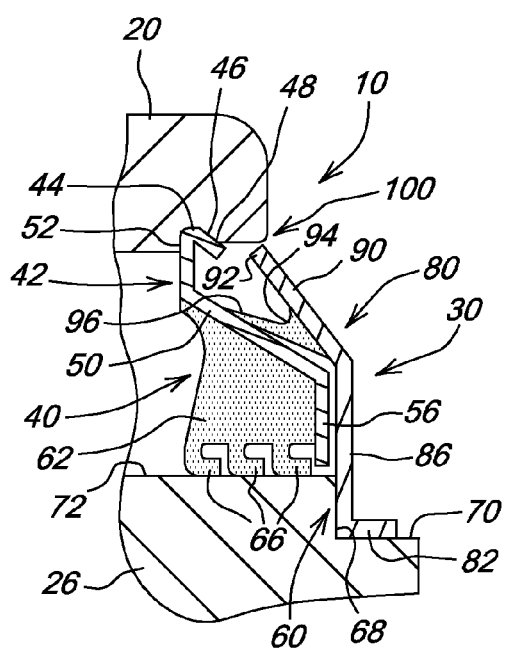
FIG. 2 is an enlarged sectional view of the sealing structure of the bearing assembly of FIG. 1.

As shown in FIGS. 1 and 2, the sealing structure 30 includes a multi-lip seal 40. The seal 40 includes a steel shroud 42 having an outer edge 44 crimped into an inner circumferential groove 46 in a stepped portion 48 of the outer ring 20. The shroud 42 extends radially inwardly from the crimped edge 44 to an axially outwardly angled or diagonal portion 50. The shroud 42 abuts an outwardly facing wall 52 the stepped portion 48 to prevent the seal 40 from moving axially inwardly from the position shown. A radial inner end portion 56 of the shroud 42 extends from the angled portion 50 towards a stepped portion 60 of the inner ring 26. A triple-lip sealing member 62 is secured to the inwardly directed face of the angled portion 50. Lips 66 extend radially inwardly at the base of the sealing member 62 and bend outwardly towards the end portion 56 of the shroud 42.

As shown in FIGS. 1 and 2, the stepped portion 60 includes a single step having an outwardly facing wall 68 defining a reduced diameter outer circumference 70 at the outermost end of the inner ring 26. The outer face of the end portion 56 of the shroud 42 projects closely adjacent the wall 68, and the shroud 42 terminates adjacent the inner ring outer circumference 72 located axially inwardly of the outermost end of the inner ring 26.

A metal slinger 80 is secured for rotation with the inner ring 26 outwardly adjacent the shroud 42. The slinger 80 forms a pressure and contaminant barrier outwardly of the seal 40 between the outer and inner rings 20 and 26. Inwardly acting forces, such as freezing material or mud build-up on the shaft 12 and high pressure impacts from liquids or trash pushing inwardly towards the seal 40 are resisted by the slinger 80.

The slinger 80 includes an L-shaped base 82 abutting the wall 68 of the step machined in the inner ring 26. The step prevents the slinger 80 from being pushed into the shroud 42. A radial slinger wall portion 86 extends outwardly from the base 82 generally parallel to the end portion 56. An inwardly angled slinger portion 90 extends radially outwardly and terminates closely adjacent the inner circumference of the stepped portion 48 of the outer ring 20.

A slinger lip seal 94 intermediate the slinger 80 and the shroud 42 is secured to the inner face of the angled portion 90 of the slinger 80 and includes a lip 96 bearing against a central area of the seal shroud angled portion 50. The seal 94 prevents contaminants that pass through an area 100 between the edge of the portion 90 and the axially outermost portion of the outer ring 20 from passing inwardly between the slinger wall portion 86 and the shroud end portion 56. The area at 100 is generally continuous and helps material exit radially from the slinger 80. The slinger angled portion 90 includes an axially outermost angled face with edge 92 generally aligned with an axially outermost face of the outer ring 20 at the area 100. The angles of the slinger and seal shroud portions and the seal lips are designed to resist and shed contaminants and direct the contaminants away from the primary seal 40.

Figure 3:
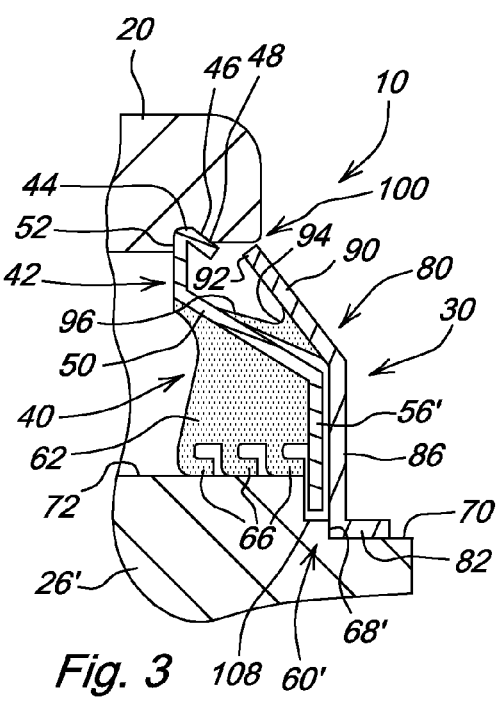
FIG. 3 is a view similar to FIG. 1 but showing an alternate embodiment of the sealing structure.

FIG. 3 shows a sealing structure similar to that shown in FIGS. 1 and 2 but including an extended shroud end portion 56' projecting adjacent a stepped portion 60' with secondary step 108 machined in an inner ring 26' and adding extra protection for the primary seal 40. The slinger 86 is seated against a primary step 68'. By extending the seal metal shroud 42 below the outside diameter of the inner ring 26', a close clearance labyrinth fit is provided at the step 108 which, together with the primary step 68', forms part of a labyrinth between the seal 62 and the slinger wall portion 86.

Figure 4:
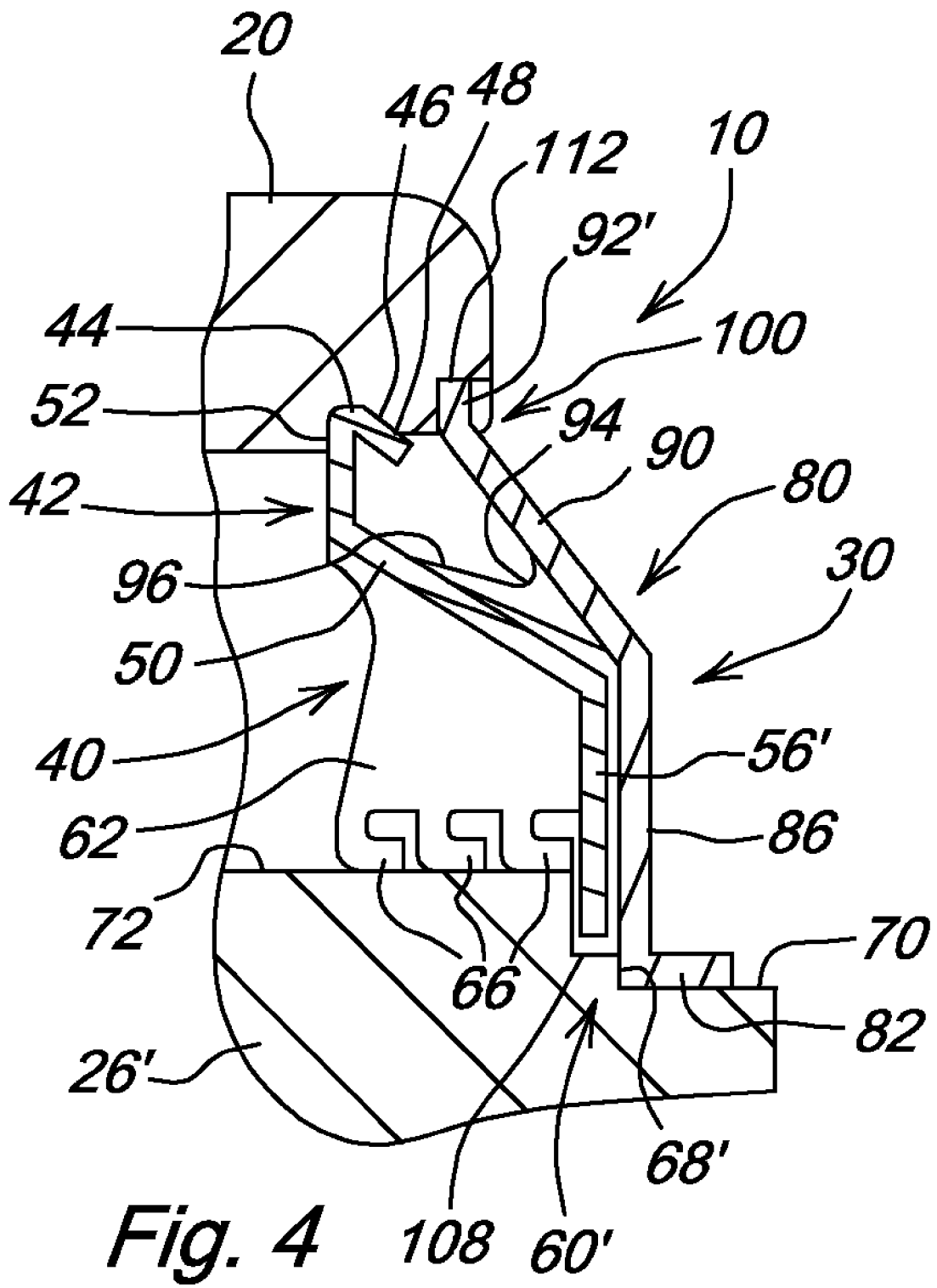
FIG. 4 is a view similar to FIG. 3 but showing yet another embodiment of the sealing structure.

To provide added support for the slinger 80, the edge 92 can be extended radially beyond the inner circumference of the outer ring 20. For example, as shown in FIG. 4, an additional step 112 is machined in the end of the ring 20 to provide a labyrinth at the slinger edge to further resist contaminant entry. When excessive axial forces act against the slinger 80, the outwardly directed face of the step 112 (or the outer face of the ring 20 if an additional step is not provided) prevent the slinger 80 from being pushed into the shroud 42.

Having described the preferred embodiment, it will become apparent that various modifications can be-made without departing from the scope of the invention as defined in the accompanying claims. For example, although the seal shroud is shown connected to the outer ring and the slinger is shown connected to the inner ring, it is to be understood that the component connections can be reversed.

The invention claimed is:

1. A contaminant resistant bearing assembly comprising:
   an axially extending outer ring;
   an axially extending inner ring rotatably supported from the outer ring for rotation about an axis;
   a multi-lip seal supported adjacent an end of the outer ring and providing a primary sealing barrier between the inner and outer rings, the seal including a metal seal shroud extending between an inner circumference of the outer ring and an outer circumference of the inner ring, the shroud having a radially extending portion axially fixed with respect to the inner and outer rings and a diagonally extending central portion supporting seal lips bearing against the inner ring axially inwardly of the metal shroud;
   a slinger connected to the inner ring for rotation with the inner ring outwardly adjacent the seal shroud;
   a lip seal located between the seal shroud and the slinger and providing secondary sealing between the slinger and the diagonally extending portion;
   wherein the inner ring includes a stepped portion, and the shroud is connected to the outer ring and includes an end portion projecting closely adjacent the stepped portion, wherein the slinger is connected to the inner ring and abuts the stepped portion; and wherein the shroud end portion projects radially inwardly of an outer circumference of the inner ring to provide a tortuous path between the slinger and the multi-lip seal.

2. The bearing assembly set forth in claim 1 wherein the lip seal is located radially outwardly of and axially aligned with the multi-lip seal.

3. The bearing assembly as set forth in claim 1 wherein the slinger includes an L-shaped base that abuts the stepped portion.

4. The bearing assembly as set forth in claim 1 wherein the stepped portion includes an outer primary step and an inner secondary step, and wherein the slinger is secured against the primary step and the shroud end portion forms a close clearance labyrinth fit with the secondary step.

5. The bearing assembly as set forth in claim 1 wherein the slinger includes a central diagonally extending slinger portion supporting the lip seal in contact with the diagonally extending central portion of the shroud.

6. A contaminant resistant bearing assembly comprising:
   an axially extending outer ring;
   an axially extending inner ring;
   a multi-lip seal supported adjacent an end of the outer ring and providing a sealing barrier between the inner and outer rings, the seal including a seal shroud extending between an inner circumference of the outer ring and an outer circumference of the inner ring, the shroud having a radially extending portion axially fixed with respect to the inner and outer rings and a central portion supporting seal lips bearing against the inner ring axially inwardly of the shroud;
   a slinger located outwardly adjacent the seal shroud, one of the inner and outer rings including a stepped portion with an axially outwardly facing step wall abutting the slinger and preventing axially inwardly directed forces from moving the slinger towards the seal shroud;
   an intermediate seal located between the seal shroud and the slinger and providing sealing between the slinger and the shroud; and
   wherein the slinger includes a radial outer edge aligned with an axially outermost face of the outer ring.

7. The bearing assembly as set forth in claim 6 wherein the seal shroud is fixed to the outer ring and the stepped portion is located at an axially outermost portion of the inner ring and supports the slinger for rotation with the inner ring.

8. The bearing assembly as set forth in claim 6 wherein slinger and the shroud include angled portions angled axially inwardly and rotating relative to each other, and wherein the intermediate seal is secured to the angled portion of the slinger and includes a single lip contacting the angled portion of the shroud.

9. The bearing assembly as set forth in claim 8 wherein the multi-lip seal includes flexible lips of generally equal length having ends flexed axially outwardly against the inner ring.

10. The bearing assembly as set forth in claim 8 wherein the single lip extends axially inwardly and radially outwardly at a contact location with the angled portion of the seal shroud.

11. A contaminant resistant bearing assembly comprising:
an axially extending outer ring;
an axially extending inner ring;
a multi-lip seal supported adjacent an end of the outer ring and providing a sealing barrier between the inner and outer rings, the seal including a seal shroud extending between an inner circumference of the outer ring and an outer circumference of the inner ring, the shroud having a radially extending portion axially fixed with respect to the inner and outer rings and a central portion supporting seal lips bearing against the inner ring axially inwardly of the shroud;
a slinger located outwardly adjacent the seal shroud, one of the inner and outer rings including a stepped portion with an axially outwardly facing step wall abutting the slinger and preventing axially inwardly directed forces from moving the slinger towards the seal shroud;
an intermediate seal located between the seal shroud and the slinger and providing sealing between the slinger and the shroud; and
wherein the stepped portion comprises first and second steps with a second wall overlapping a radially extending portion of the seal shroud axially inwardly of the step wall.

12. The bearing assembly as set forth in claim 9 wherein the seal shroud is fixed to the outer ring and the stepped portion is located in the inner ring and supports the slinger for rotation with the inner ring.

13. A contaminant resistant bearing assembly comprising:
an axially extending outer ring;
an axially extending inner ring;
a lip seal supported adjacent an end of the outer ring and providing a sealing barrier between the inner and outer rings, the seal including a seal shroud extending between an inner circumference of the outer ring and an outer circumference of the inner ring, the shroud having a radially extending portion axially fixed with respect to the inner and outer rings and a central portion supporting seal lips bearing against the inner ring axially inwardly of the shroud;
a slinger located outwardly adjacent the seal shroud, the inner ring including a stepped portion with an axially outwardly facing step wall abutting the slinger and preventing axially inwardly directed forces from moving the slinger towards the seal shroud;
an intermediate seal located between the seal shroud and the slinger and providing sealing between the slinger and the shroud; and
wherein the slinger includes a radial outer edge aligned with an axially outermost face of the outer ring.

14. The bearing assembly as set forth in claim 13 wherein the slinger includes a radial outer edge projecting into a second stepped portion adjacent an axially outermost face of the outer ring and providing resistance to axially inwardly directed forces and preventing the slinger from moving towards the seal shroud.

15. A contaminant resistant bearing assembly comprising:
an axially extending outer ring;
an axially extending inner ring;
a multi-lip seal supported by the outer ring and providing a sealing barrier between the inner and outer rings, the seal including a seal shroud secured in a stepped portion of an inner circumference of the outer ring, the shroud having a radially extending portion axially fixed with respect to the outer ring and a central portion angled with respect to the radial direction, the shroud supporting lip seal structure bearing against the inner ring axially inwardly of the shroud;
a slinger located outwardly adjacent the seal shroud and secured against a stepped portion in the inner ring;
a second seal located between the seal shroud and the slinger and providing sealing between the slinger and the shroud; and
wherein the second seal comprises a single lip extending axially inwardly and radially outwardly from the slinger to a contact location with the angled central portion of the seal shroud;
wherein the slinger includes a circumferential portion angled axially inwardly adjacent the central portion of the seal shroud and having an outermost edge generally aligning with an axially outermost portion of the outer ring, and wherein the second seal is connected to the circumferential portion of the slinger.

16. The bearing assembly as set forth in claim 15 wherein the second seal is secured to the circumferential portion of the slinger and includes a lip contacting the central portion of the shroud.

17. The bearing assembly as set forth in claim 15 wherein the multi-lip seal includes flexible lips having ends flexed axially outwardly against the inner ring.

18. The bearing assembly as set forth in claim 15 wherein the outermost edge projects radially adjacent the axially outermost portion of the outer ring, the outer ring providing resistance to inwardly directed axial forces acting against the slinger.

* * * * *